June 27, 1950         E. A. RICE         2,512,678

AQUARIUM

Filed April 11, 1947

INVENTOR.
Earl A. Rice
BY Robert E. Barry
Attorney

Patented June 27, 1950

2,512,678

UNITED STATES PATENT OFFICE 2,512,678

AQUARIUM

Earl A. Rice, Mercersburg, Pa.

Application April 11, 1947, Serial No. 740,921

5 Claims. (Cl. 119—5)

This invention relates to an aquarium and more particularly to an aquarium of the portable form as is commonly used to display a relatively small number of fish for amusement purposes.

Aquariums of this character are usually in the form of a transparent bowl of relatively small dimensions, and accordingly the activities of fish therein are substantially limited with a corresponding limitation in the amusement which they present.

A primary object of this invention is the provision of an aquarium of the portable display type which provides a substantial range of movement for fish therein whereby the fish not only acquire sufficient exercise but provide greater amusement as a result of their increased activities afforded by the range of movement.

A further and more specific object of the invention is the provision of a portable aquarium including a transparent bowl having a handle in the form of a transparent conduit in communication with the bowl, and wherein the conduit is adapted to be filled with water as is also the bowl to a level above the zones of communication between the conduit and bowl, whereby fish may have a circuitous course of movement and their activities may be observed through the bowl as well as through the handle.

Other objects and advantages of the invention will present themselves in the course of the following detailed description, taken in consideration with the accompanying drawings, in which.

Figure 1:
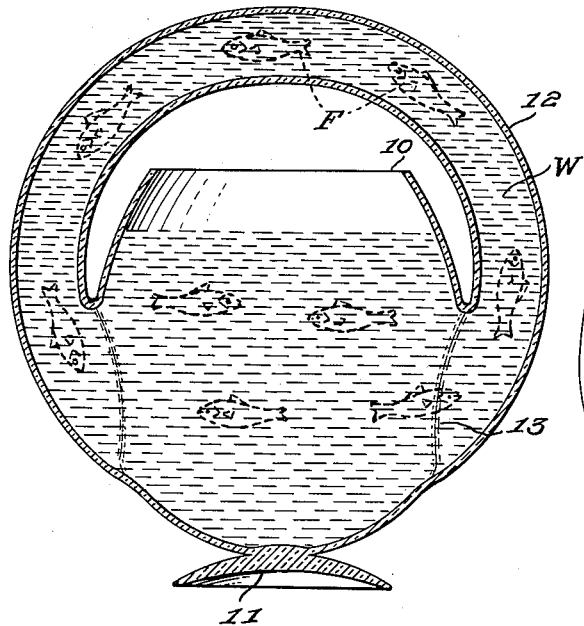
Fig. 1 is a vertical sectional view of the improved aquarium, the section being in the plane of the axis of the handle.
Figure 2:
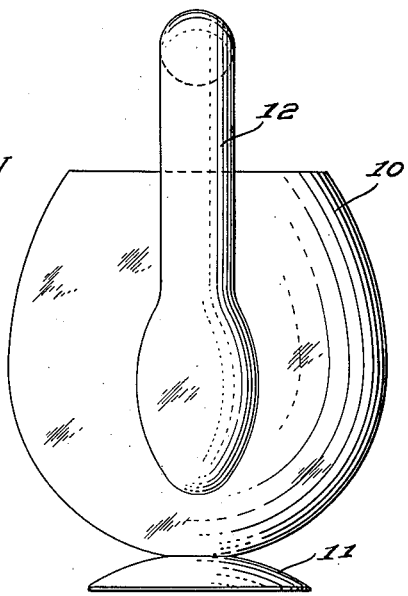
Fig. 2 is an elevational view as observed from the right or left of Figs. 1 and 3.
Figure 3:
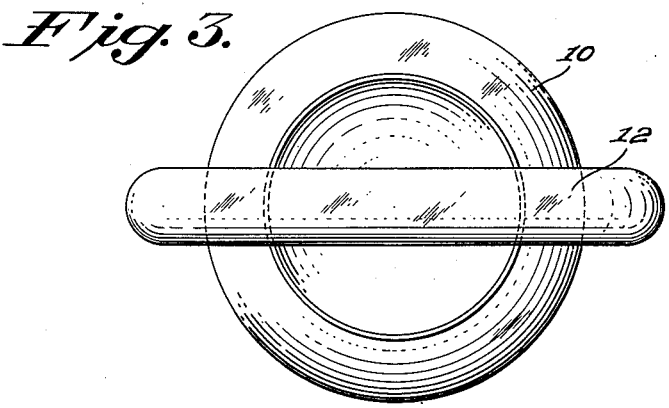
Fig. 3 is a top plan view.

Referring now in detail to the drawing, 10 designates a bowl which is provided with a suitable supporting base 11. The bowl is provided with a handle 12 in the form of a conduit which communicates with the bowl at diametrically opposed zones as indicated at 13.

The bowl 10, base 11 and handle 12 are of unitary construction and are formed of glass, as indicated, or of other suitable transparent material.

As is indicated in Fig. 1, the handle is filled with water W as is also the bowl to a level between the top thereof and the zones of communication between the handle and bowl. The bowl and handle can thus be filled with water upon submerging both the bowl and handle in a body of water with the result that air will be forced out of the handle and displaced by water.

After the handle and bowl are thus filled with water, a small volume of water may be removed by any suitable means from the top of the bowl whereby the bowl and handle will be filled substantially as indicated in Fig. 1.

It will be observed that with the improved construction, fish F will have a range of movement through the bowl 10 as well as through the conduit or handle 12, as is clearly indicated in Fig. 1.

With this increased range of movement, which provides a circuitous course, the fish will swim with greater speed and more action, which together with the increased area of visibility of the fish as afforded by both the bowl and handle, the amusement provided by the aquarium will be substantially greater than that provided by aquariums of this general character heretofore in use. It is to be particularly noted that the handle 12 is endowed with two functions, first, it provides for convenient movement of the aquarium, and, second, it provides a substantially long arcuate passageway for the fish from one side of the bowl to the other side.

While the invention is disclosed in accordance with a single specific embodiment thereof, wherein the bowl is substantially spherical and the handle is circular in cross section, other forms of bowl and handle may be used within the scope of the invention, as defined in the following claims.

What I claim and desire to secure by Letters Patent is:

1. An aquarium comprising, an open bowl of transparent material and having a generally convex outer wall surface and a relatively flat base portion, the wall of said bowl having diametrically opposite openings therein, a hollow handle having end portions and formed of transparent material extending from one of said openings arching above the bowl to the other opening, the ends of said hollow handle being in open communication with the interior of the bowl and joining the wall of the bowl in liquid tight relationship.

2. An aquarium comprising, a rigid transparent receptacle having an open mouth, opposite wall portions of said receptacle having openings therethrough below the mouth of the receptacle, a rigid transparent hollow conduit having end portions, one end portion of the hollow conduit joining one wall portion of the receptacle around one opening in a liquid-tight relationship, said conduit extending upwardly therefrom and thereafter downwardly with the other end portion of the hollow conduit joining the other wall portion of the receptacle around the opening therein in a liquid-tight relationship, and said hollow conduit being in open communication with the interior of the receptacle and forming a handle therefor.

3. An aquarium comprising, an open bowl of transparent material and having a generally convex outer wall surface, the wall of said bowl having diametrically opposite openings therein, a tubular handle having end portions and formed of transparent material, said handle extending upwardly from one of said openings and thereafter downwardly to the other opening, the ends of said tubular handle being in open communication with the interior of the bowl and joining the wall of the bowl in liquid-tight relationship, and a portion of the bowl extending above the openings for maintaining liquid therein at a level higher than upper edge portions of the openings.

4. An aquarium comprising, a generally cup-shaped receptacle of transparent material and having an arcuate outer wall surface, the wall of said receptacle having diametrically opposite openings therein, a hollow handle having end portions and formed of transparent material extending from one of said openings arcuately above the receptacle to the other opening, the ends of said hollow tubular handle being in open communication with the interior of the receptacle and integral with the wall of the receptacle, a wall portion of the bowl extending above the openings for maintaining liquid therein at a lever higher than upper edges of said openings, and said handle and said receptacle being substantially rigid.

5. In an aquarium, a generally cup-shaped transparent bowl having a substantially convex outer wall surface, the wall of said bowl having diametrically opposite openings therein, an imperforate transparent tubular member of arcuate shape and having open end portions, one end portion of the tubular member being integral with said wall around one of the openings therein and arching above the bowl with the other end integral with the wall around the other opening, said tubular member being in open communication with the interior of the bowl, a portion of the wall being above upper edges of said openings and forming an open mouth for the bowl, and said tubular member providing a handle for the bowl.

EARL A. RICE.

REFERENCES CITED

The following references are of record in the file of this patent:

UNITED STATES PATENTS

| Number | Name | Date |
| --- | --- | --- |
| De. 84,002 | Smith | Apr. 21, 1931 |
| 192,595 | Palen et al. | July 3, 1877 |
| 1,576,462 | Polzin | Mar. 9, 1926 |
| 1,943,417 | Bringman | Jan. 17, 1934 |
| 2,059,927 | Beck | Nov. 3, 1936 |